United States Patent [19]

Jacobsen

[11] Patent Number: 4,901,956
[45] Date of Patent: Feb. 20, 1990

[54] METHOD OF MANUFACTURING GAS TIGHT AND WATER TIGHT CABLE TRANSITS AND METHOD OF MAKING SAME

[76] Inventor: Clas T. Jacobsen, Braaten 25A, Drammen, Norway

[21] Appl. No.: 895,905

[22] Filed: Aug. 12, 1986

[30] Foreign Application Priority Data

Aug. 12, 1985 [NO] Norway .............................. 85.3167

[51] Int. Cl.⁴ .............................................. F16L 5/00
[52] U.S. Cl. ........................................ 248/56; 174/48; 248/68.1
[58] Field of Search .......................... 248/49, 56, 681; 52/220; 138/106, 112; 174/48, 49

[56] References Cited

U.S. PATENT DOCUMENTS

| 1,822,475 | 9/1931 | Burke | 138/112 |
| 1,851,940 | 3/1932 | Williams | 248/56 X |
| 3,489,440 | 1/1970 | Brattberg | 248/56 |
| 4,061,344 | 12/1977 | Bradley | 248/56 X |
| 4,291,195 | 9/1981 | Blomquist et al. | 248/56 X |

Primary Examiner—David L. Talbott

[57] ABSTRACT

Gas tight and water tight cable transits comprise a pair of elements of a rigid material each having a narrow layer of resilient sealing material molded integrally therewith which upon clamping of the elements together in a frame expands radially for sealing against the cable and abutting elements and frame parts. In another embodiment, the narrow portion of resilient material is secured to one end of a cable transit element a pair of elements being assembled end-to-end and clamped together to define a seal intermediate the elements.

9 Claims, 3 Drawing Sheets

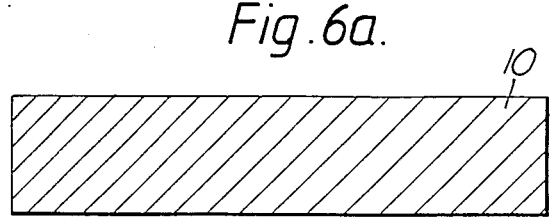
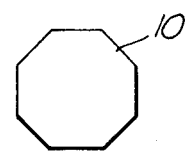
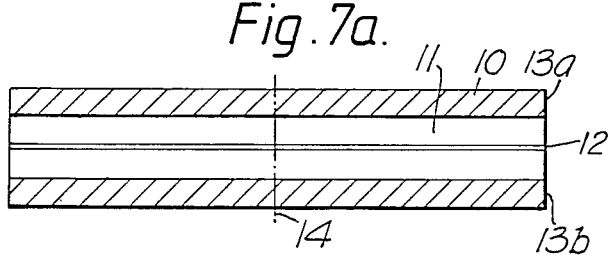
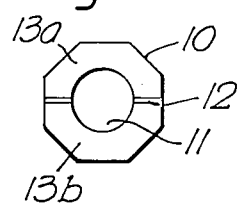
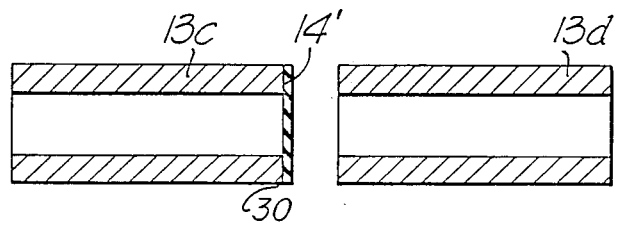
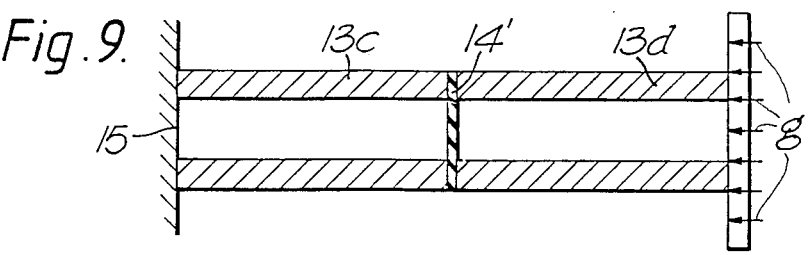
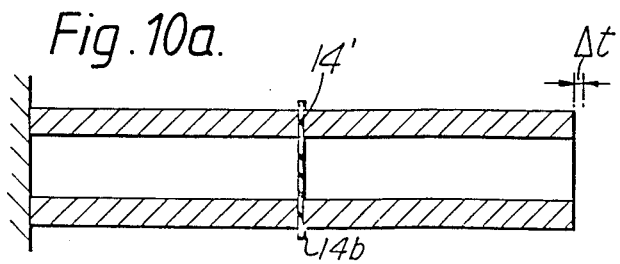
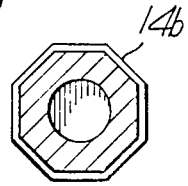

METHOD OF MANUFACTURING GAS TIGHT AND WATER TIGHT CABLE TRANSITS AND METHOD OF MAKING SAME

FIELD OF THE INVENTION

The present invention relates to gas and water tight cable transits and to methods for manufacturing same.

BACKGROUND OF THE INVENTION

There are previously known cable transits which comprise two or more elements which are adapted to encircle a cable, the cable transits being clamped in a frame which is mounted in the wall or the obstacle through which the cables have to pass. The cable transits are fabricated of a flame and heat resistant material for safety purposes.

A shortcoming of such known cable transits is that they do not provide a sufficient seal to be classified as gasproof and waterproof.

SUMMARY OF THE INVENTION

An object of the present invention is to provide cable transits which are not only flame and heat resistant, but which also can be classified as gasproof and waterproof.

According to one aspect of the invention, a method for manufacturing gas tight and water tight cable transits comprises molding a block of a rigid material into first and second portions, with a layer of a resilient sealing material extending between the first and second portions, and providing a cable receiving base through the block transverse to the plane of the layer of sealing material between the first and second portions of rigid material. The method further comprises cutting the block transversely the plane of the layer of sealing material to provide first and second elements each having first and second portions of rigid material separated by a layer of resilient sealing material.

In a preferred embodiment, a gas tight and water tight cable transit comprises first and second elements of a rigid material assembled together with a layer of sealing material interposed between the first and second elements, the elements defining a cable receiving through bore extending transversely to the plane of the layer of sealing material, and means clamping the first and second elements together thereby compressing the sealing material therebetween causing a portion of the sealing material to expand radially inwardly into the through bore to provide a seal between an inner surface of the elements defined by the bore therethrough and a cable extending through the provided bore in the elements.

Each of the cable transits thus manufactured is substantially rigid, i.e. each element is not compressible, with the exception of the resilient insert portion thereof. After assembly in a suitable frame, the cable transits are subjected to force at their outer ends compressing the resilient insert portions causing them to expand and close the gaps between cable and adjoining transits and frame parts providing an air tight and water tight seal therebetween.

Further in accordance with the invention, a second method for manufacturing gas tight and water tight cable transits comprises forming an elongated rod of a rigid material and having first and second end surfaces, forming a cable receiving bore through the rod along the longitudinal axis between the first and second end surfaces thereof, cutting the rod transversely to the longitudinal axis thereof to form first and second elements each having first and second end surfaces, and securing a layer of resilient sealing material to the first end surface of at least one of the elements, whereby upon assembly of the first and second elements together in end-to-end relationship with their first end surfaces abutting and with a cable extending through the bore, and applying inwardly directed forces to the second end surfaces of the first and second elements, the resilient sealing material is compressed between the first end surfaces and expands radially into the cable receiving bore to provide a seal between the surface of the receiving bore and the outer surface of a cable extending through the bore.

Such rods can be provided by extrusion and shaped, for example, by cutting or planing. The rods can be formed by molding, the molded pieces subsequently being shaped by, for example, planing or other cutting methods.

A gas tight and water tight cable transit including first and second elements manufactured in accordance with the method according to the invention are thus characterized in that each element comprises a narrow layer of resilient sealing material which upon clamping of the elements in a frame expands radially for sealing against the cable and adjoining elements and frame parts. The narrow layer of resilient sealing material is an be molded into the elements, or can be glued or otherwise secured onto one end of one of the elements.

In the following, the invention will be further described, reference being had to the drawings, which illustrate embodiments of the manufacturing according to the present invention as well as embodiments of cable transits which can be provided by the manufacturing.

BRIEF DESCRIPTION OF THE DRAWINGS

FIGS. 6a and 6b illustrate a longitudinal section; and an end view, respectively, of an extruded rod shaped element;

FIGS. 7a and 7b illustrate a longitudinal section and an end view, respectively, of the rod shaped element of FIG. 6a provided with a longitudinal bore and longitudinally cut;

FIG. 8 illustrates the rod element of FIGS. 7a and 7b after transversely cutting and the application of a resilient layer on one of the cut surfaces;

FIG. 9 illustrates the two sections of the element according to FIG. 8 mounted in a frame; and FIGS. 10a and 10b illustrate a longitudinal section and a transverse section, respectively, of the two sections of FIG. 9 under compression.

DESCRIPTION OF THE PREFERRED EMBODIMENT

Figure 1:
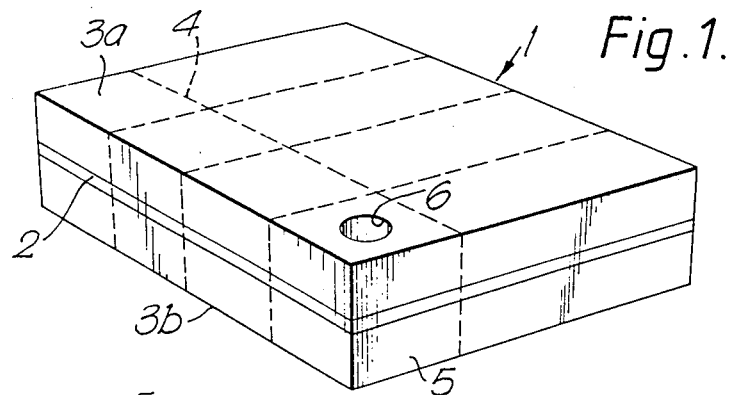
FIG. 1 is a perspective view of a molded blank for gas tight and watertight cable transits provided by the present invention.

In FIG. 1 there is illustrated a perspective view of a blank which is generally designated by 1, and which by example is procured by molding of a fire and flame resistant material, the molded blank taking the form of a box-shaped body. The material from which the blank is molded, can for example be of the type which is disclosed in specification U.S. Pat. No. 4,543,281.

The advantage of using a material of the type which is discussed in specification U.S. Pat. No. 4,543,281, is that this material, at a temperature below approximately 200 degrees C., is a relatively good heat conductor and consequently dissipates excess heat. At temperatures above 200 degrees C. the polymeric matrix component of the material begins to swell and forms a porous, thermal insulating material, the swelling of the material being approximately in the range of 30–40% on a linear basis (e.g. greater than 100% on a volume basis). During heat exposure the material softens at a temperature of 95 degrees C., but due to its high melt viscosity the material will keep its shape during heating, swelling and eventually sintering at temperatures in the range of 800–1200 degrees C.

However, these properties do not provide a gas and waterproof cable sealing element or transit at usual room temperatures or at normal operating temperatures, and consequently in accordance with the invention, there has during the molding of the blank 1 been included a plate or layer 2 of resilient material, for example rubber, approximately midways between the largest end surfaces of the box, i.e. the top 3a and the bottom 3b, the resilient material 2 being molded permanently to the thermal insulating material.

However, it is to be understood that other materials then what has been disclosed in the above mentioned U.S. patent specification can also be used.

After the finished molded body has cured, multiple edge blocks are cut transversely to the plane of the rubber plate 2, the dashed lines 4, illustrating alternative cutting of the blank 1. In FIG. 1 there is by means of dashed lines illustrated an example of a block 5 which can be cut from the blank 1, the block 5 having a prismatic shape and after the cutting being provided with a through-going hole or bore 6 transversely to the plane of the rubber plate 2.

Figure 2:
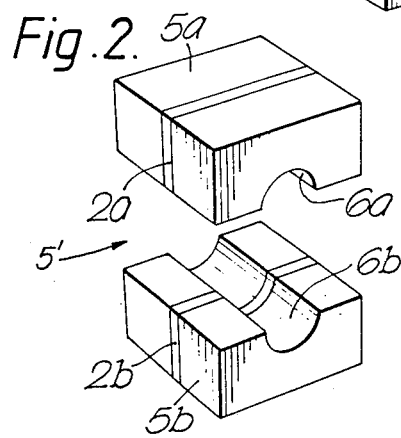
FIG. 2 is a perspective view of a first embodiment of a two-piece cable transit which can be cut from the blank of FIG. 1.

In FIG. 2, there is illustrated a perspective view of a first embodiment of the block 5 which is cut from the blank 1 of FIG. 1, the block here being cut in a plane transversely to the rubber plate plane for the forming a cable transit 5' comprised of two elements 5a and 5b, respectively. By longitudinal cutting of block 5, the bore 6 will form two semi-circular recesses 6a and 6b, respectively, which are adapted to the outer dimensions of the cable which is to be held by the cable transit.

Each of the cable transit elements 5a and 5b thus comprises a narrower portion, 2a and 2b, respectively, of resilient sealing material which when the elements 5a and 5b are clamped together in a frame, will expand in the radial direction of the cable for sealing against the cable and adjoining transits and frame parts, as will be explained in the following.

Figure 3:
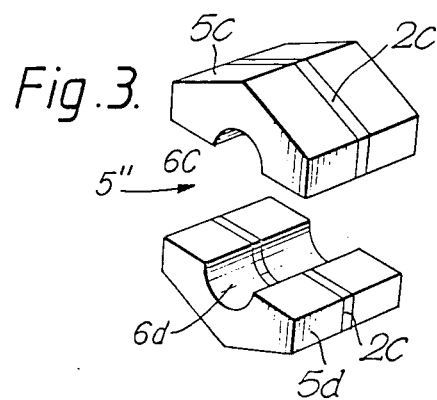
FIG. 3 is a perspective view of a second embodiment of a two-piece cable transit which can be cut from the blank of FIG. 1.

In FIG. 3, there is illustrated a perspective view of a second embodiment of a two-piece cable transit 5" including elements 5c and 5d. The two elements 5c and 5d which comprise the two-piece cable transit 5" are formed from a hexagonal block which is cut from the blank 1 of FIG. 1. The elements 5c and 5d include a narrow band or portion of resilient, sealing material, designated 2c, approximately midway between lateral surfaces. The through bore 6 (FIG. 1) provided through the cable transists 5 forms two semi-circular recesses 6c and 6d in the elements 5c and 5d, respectively.

Figure 4A:
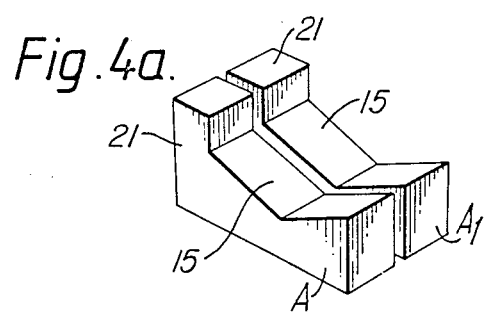
FIGS. 4a-4e illustrate various embodiments of cable transits provided by this invention.
Figure 4B:
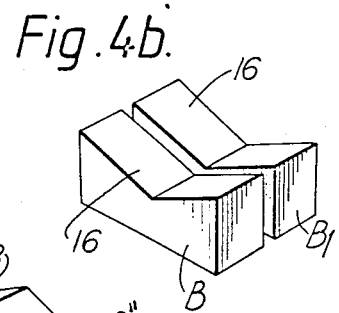
Figure 4C:
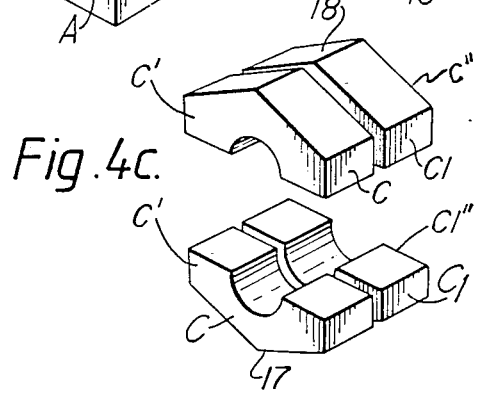
Figure 4D:
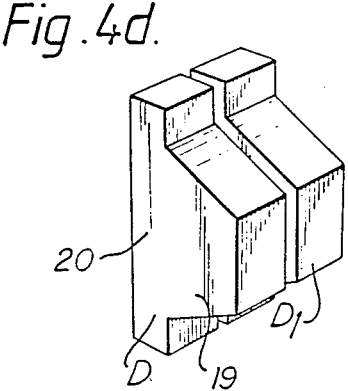
Figure 4E:
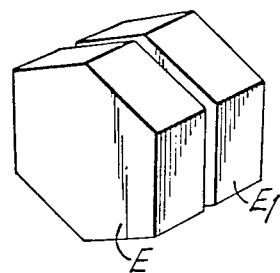

Referring to FIGS. 4a–4e, there are illustrated various embodiments of cable transit elements which are adapted for mounting in a cable frame 7 (FIG. 5) as will be shown. The individual cable transits can be formed in the same manner as discussed above for elements 5a, 5b and 5c, 5d (FIGS. 2 and 3), being provided with an intermediate resilient sealing band or portion, or can be transversely cut as individual elements as illustrated in FIGS. 4a–4e providing a pair of elements such as elements A and A1 in FIG. 4a, elements B, B1 as shown in FIG. 4b, elements C and C' and C1 and C1' as shown in FIG. 4c, elements D and D' as shown in FIG. 4d and elements E and E' as shown in FIG. 4e.

Figure 5:
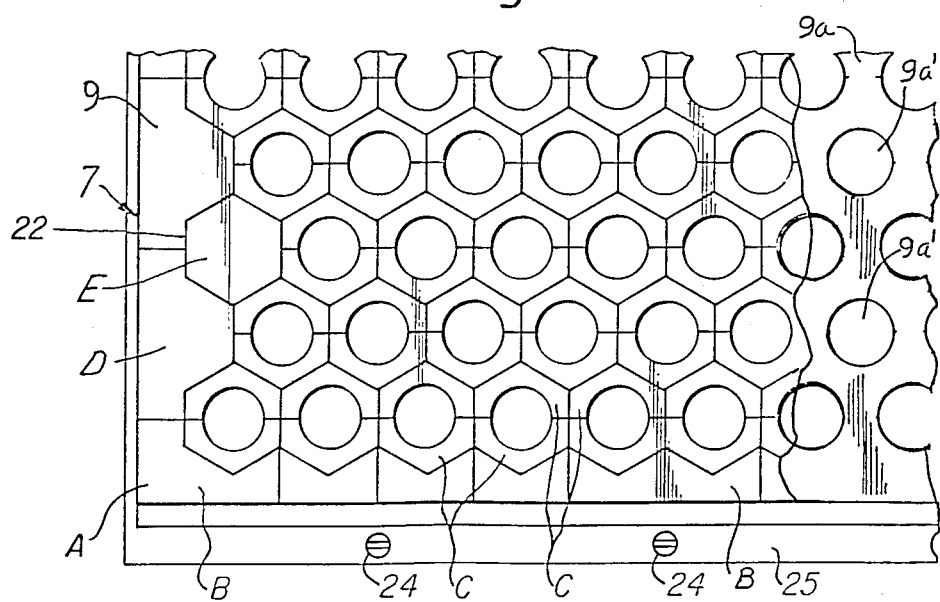
FIG. 5 illustrates the cable transits of FIG. 4 mounted in a frame formed by a pair of grid members, with the frame cut away at one side thereof to show more clearly one of the grid members.

In use, the elements shown in FIGS. 4a–4e are assembled together, defining a generally honeycombed structure as illustrated in FIG. 5 which provides sealing and insulating pass throughs or cable transits. The elements are configured to define a generally rectangular assembly with the elements being held together by a clamping means such as a frame assembly 7 including a frame 8. Elements A (FIG. 4a) are configured to define corner members for the assembly. Elements B (FIG. 4b) are configured to define top and bottom members for the assembly. Elements D (FIG. 4d) are configured to define side elements for the assembly. The elements A, B and D define the border of the assembly. The elements C (FIG. 4c) are assembled within the border, defining the cable pass throughs or transits which provide fluid-tight sealed passageways for the cables through a wall or object.

With reference to FIGS. 4a, 4b, 4c and 5, the upper surface 15 of side elements A and the upper surfaces 16 of top and bottom elements B have a generally V-shaped configuration which conforms to the generally triangular shape of the lower surfaces 17 and upper surface 18 of member C, to permit the members A, B and C to be assembled together in the matrix illustrated in FIG. 5.

Side elements D (FIG. 4d) have a generally trapezoidal shaped projection 19 extending from a generally rectangular base portion 20 and which cooperates with a generally rectangular portion 21 of the corner members A and rectangular portions 20 of adjacent side members in the matrix to define a generally equalateral trapezoidal shaped space for receiving the like shaped surface of a pair of assembled members C.

The number of cable passageways is defined by the number of elements C employed in the matrix. Any of number of elements C can be employed and by way of example a matrix may contain six rows of elements C with six elements in each row defining 36 passageways. In cases where less than six cables would be provided in a given row, a solid element E (FIG. 4e) is employed in place of the elements C.

Figure 4F:
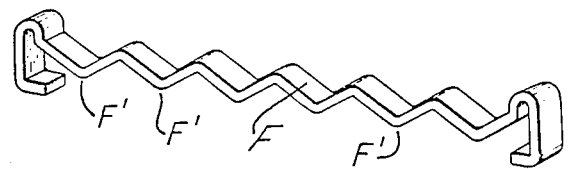
FIG. 4f illustrates a clamping member for use with the cable transits.

Clamping members F (FIG. 4f) are adapted for use in pairs to clamp together six pairs of elements C, C1 to compress the resilient material thereof into sealing configuration. One member F is located at the forward surface C' of the elements C and the other member F located at the rearward surface C" of elements C1. Inwardly directed portions F' of the members F engage the surfaces C' and C1 of the elements.

Referring to FIG. 5, in assembling the matrix of elements 5, first a pair of clamping elements F (FIG. 4f) or a pair of grid-like members (9 and 9a) are placed into the frame 8, one at each side. The two grid-like members 9 and 9a are identical, and the frame is shown in FIG. 5 cut away at the right side thereof to show more clearly the rearmost grid-like member 9a. Each grid-like member, such as member 9a, is a plate-like member having a plurality of apertures 9a' with which the through bores of the elements are aligned when assembled in matrix form in the frame. Thereafter, a corner element pair A is mounted into the frame followed by a plurality of top and bottom elements pairs B. A further corner member A is mounted into the frame at the other corner.

Then, the lower halves, elements C, C1, of cable sealing elements C are put into position with their trapezoidal surface 17 engaging the V-shaped surface 15 of corner element A. A further element C is then put in place with its lower surface 17 engaging the V-shaped surface 16 of the first element B, etc., until the row of lower halves of elements C is completed. Then, a first row of cables (not shown) are pulled and positioned in the semi-circular openings 6d defined by the elements C. Thereafter, the upper halves of the elements C-C1 are put into position above the cables. Then, a pair of side members D are put into place and a second row of lower halves of elements C-C1 are put into position for the next cable row. The cables for the second row are then put into position in the next available row of cable elements C-C1 and the upper halves of the cable sealing elements C-C1 in the second cable row are then put in position above the cables.

This procedure is completed until the complete matrix is assembled within the frame assembly 7. As indicated, any openings such as 22 where a cable is not present is closed by means of a solid element E.

When the assembly of the matrix of cable transits is completed and all the cables have been pulled and positioned in the pass through or cable transit matrix, the frame is closed at the top. The tightening screws 24 in the flanges 25 at the lower and upper edges of the frame 8 are tightened, subjecting the grid walls to a moderate pressure which moves the cable transits contained therebetween towards one another. This causes the two elements of each cable transit to compress the rubber gasket or resilient member embedded therebetween. The gasket expands between the cable transits themselves and forms a sealing against the cable passing therethrough and adjoining cable transits and parts of the frame.

In the foregoing embodiments, the cable transits were formed by a molding process. The material employed for the elements of the cable transits can also be extruded and the elements can be made in rod shaped which is then cut and formed to the desired configuration. Referring to FIGS. 6a and 6b, there are illustrated a longitudinal section and an end view, respectively of an extruded externally shaped rod 10 which can be used to form cable transit elements. The rod 10 is formed of the material of the type discussed in specification U.S. Pat. No. 4,543,281.

Referring to FIGS. 7 and 7b, the rod 10 is provided with a longitudinal bore 11 and then cut in half along the longitudinal axis defining an upper element or section 13a and a lower element or section 13b which may be assembled together in the manner of elements 5c and 5d (FIG. 3) which are separated by the cut 12 between the upper half 13a and the lower half 13b.

Referring to FIG. 8, prior to cutting the rod 10 in half, longitudinally, the rod may be cut transversely along severing line 14 (FIG. 7a) to define left and right sections 13c and 13d, respectively as shown in FIG. 8. The sealing or gasket material or rubber layer 14' is applied to one surface 30 by gluing or other suitable method. A central aperture (not shown) is provided through the sealing member 14'.

Referring to FIG. 9, the two elements 13c and 13d, (each of which may be cut in half defining upper and lower elements as in FIG. 7a) are illustrated assembled in a frame 15, shown diagrammatically, and a force g is applied to the frame compressing the gasket material 14 between the two elements 13c and 13d. Accordingly, when the assembly 13 is employed in a matrix as a cable transit, and placed under compression, the rubber gasket 14' when compressed will project radially of the element 13 as indicated at 14b in FIG. 10a, implementing the desired gas and waterproof seal in accordance with the present invention.

It is to be understood that the above discussed cable transits, in element or rod form, are put in position in the frame with very little play, and that the displacement necessary for the resilient layer to swell sufficiently for forming a gas tight and water tight gasket, is very small. In FIG. 10a the displacement is illustrated by the reference symbol $\Delta t$, and in FIG. 10b the compressed rubber gasket is illustrated in a somewhat exaggerated scale.

In use, the fireproof and gas tight and waterproof cable transits according to the invention are assembled in a frame which can hold for example a matrix of $6 \times 6$ cables, the gap which is to be sealed between adjacent elements, the cables and sealing elements, etc. may be in the order of 1 mm.

Thus, the present invention provides cable transits which are rigid and not compressible, except from the rubber gasket or sealing members. The cable transits can be manufactured by being cut from a block of a suitable fire and flame retardent material having a rubber layer molded or embedded therein or may be extruded in rod form, cut to the desired configuration and have the gasket or sealing material applied to the rod shaped element. The cable transits make possible fluid sealing without the use of plastic or floating sealing means, and the installation and possible rearrangement of the cable transits and cable involves a simple and clean operation. This is so because the material from which the cable transits are made is characterized by a low friction and does not require use of sticky sealing means to provide the requisite seal. The materials can easily be combined with non-metallic frames which can be appropriate in certain environment.

I claim:

1. A gas tight and water tight cable transit comprising: first and second elements each having first and second body portions of a rigid material and a layer of resilient sealing material interposed between said first and second body portions of said elements and formed integrally with at least one of said body portions, and said elements being adapted to be assembled together with opposing surfaces defining a cable receiving through bore extending transversely to the plane of said layer of sealing material, and means clamping said first and second elements together thereby compressing said sealing material between said rigid body portions, causing a portion of said sealing material to expand radially inwardly into the through bore to provide a seal between an inner surface of the bore and an outer surface of a cable extending through the bore defined by said elements.

2. A cable transit according to claim 1, wherein a further portion of said sealing material expands radially outwardly beyond the outer surface of said elements when said elements are clamped together.

3. A cable transit according to claim 2, wherein said first and second body portions of said elements are hollow cylindrically-shaped members each having first and second end surfaces, said layer of sealing material being secured permanently to the first end surface of at least one of said members, said members being assembled in end-to-end relationship, with their first surfaces in abutting relationship and said clamping means engaging said second end surfaces of said first and second members, urging said first surfaces of said first and second members towards one another.

4. A cable transit according to claim 2, wherein said first and second elements when assembled together define a hexagonal configuration in a plane transverse to the axis of the elements and said elements are adapted for assembly within a frame means with a plurality of like configured first and second element pairs, each pair including a layer of resilient sealing material and each pair defining a sealed cable passageway through a wall or other surface, the further portion of resilient sealing material of a given pair of elements providing a sealing between the outer surface of the elements of said given pair and the outer surfaces of elements located adjacent to said given pair of elements in the frame means.

5. A cable transit according to claim 1, wherein each of said elements is cut in half axially thereof defining upper and lower cable receiving portions for the element.

6. A cable transit according to claim 1, wherein said first and second body portions comprise a fire and flame resistant material.

7. A gas and water tight cable transit comprising: an elongated tubular member having first and second portions of a rigid material, a layer of resilient sealing material between said first and second portions and permanently secured to at least one of said portions of said member, said layer of sealing material extending transversely to the longitudinal axis of said member, and said member having a through bore extending axially thereof through said first and second portions.

8. A gas tight and water tight cable transit comprising: first and second elements each having first and second body portions of a rigid material and a layer of resilient sealing material interposed between said first and second body portions and formed integrally therewith;

said first and second elements having respective first and second surfaces with a generally semi-circular channel therein which extends axially of said element, said elements being adapted to be assembled together with said first and second surfaces opposing one another and the channels therein aligned one with the other to define a cable receiving through bore extending transversely to the plane of said layer of sealing material, and means clamping said first and second elements together thereby compressing said sealing material between the body portions thereof causing a portion of said sealing material to expand radially inwardly into the through bore to provide a seal between an inner surface of the bore and an outer surface of a cable extending through the bore defined by said elements.

9. A cable transit according to claim 8, wherein said first and second body portions comprises a fire and flame resistant material.

* * * * *

UNITED STATES PATENT AND TRADEMARK OFFICE
CERTIFICATE OF CORRECTION

PATENT NO. : 4,901,956
DATED : February 20, 1990
INVENTOR(S) : Clas T. Jacobsen

It is certified that error appears in the above-identified patent and that said Letters Patent is hereby corrected as shown below:

On the cover page after "Inventor: Clas T. Jacobsen, Braaten 25A, Drammen, Norway", insert --Assignee: A/S Norsk Kabelfabrik, Drammen, Norway--;

Column 4, line 8, delete "transists" and insert --transits--.

Signed and Sealed this

Twenty-eighth Day of May, 1991

*Attest:*

HARRY F. MANBECK, JR.

*Attesting Officer*  *Commissioner of Patents and Trademarks*